(12) United States Patent
Wang et al.

(10) Patent No.: US 11,817,911 B2
(45) Date of Patent: Nov. 14, 2023

(54) ACTIVE FEEDBACK CONTROL METHOD FOR QUANTUM COMMUNICATION SYSTEM BASED ON MACHINE LEARNING

(71) Applicant: Nanjing University of Posts and Telecommunications, Jiangsu (CN)

(72) Inventors: Qin Wang, Jiangsu (CN); Jingyang Liu, Jiangsu (CN)

(73) Assignee: Nanjing University of Posts and Telecommunications, Jiangsu (CN)

(*) Notice: Subject to any disclaimer, the term of this patent is extended or adjusted under 35 U.S.C. 154(b) by 721 days.

(21) Appl. No.: 17/040,996

(22) PCT Filed: Jan. 6, 2020

(86) PCT No.: PCT/CN2020/070401
§ 371 (c)(1),
(2) Date: Sep. 24, 2020

(87) PCT Pub. No.: WO2020/238224
PCT Pub. Date: Dec. 3, 2020

(65) Prior Publication Data
US 2022/0182152 A1    Jun. 9, 2022

(30) Foreign Application Priority Data
May 31, 2019 (CN) .......................... 201910469672.X

(51) Int. Cl.
*H04B 10/70* (2013.01)
*H04L 9/08* (2006.01)
*G06N 3/044* (2023.01)

(52) U.S. Cl.
CPC ............ *H04B 10/70* (2013.01); *G06N 3/044* (2023.01); *H04L 9/0858* (2013.01)

(58) Field of Classification Search
None
See application file for complete search history.

(56) References Cited

U.S. PATENT DOCUMENTS

2020/0412532 A1* 12/2020 Shi .................. H04L 9/302

FOREIGN PATENT DOCUMENTS

| CN | 105490805 | 4/2016 |
| CN | 107612688 B * | 9/2017 |

(Continued)

OTHER PUBLICATIONS

Jing-Yang Liu, et al., "Practical Phase-Modulation Stabilization in Quantum Key Distribution via Machine Learning." Physical Review Applied, vol. 12, No. 1, Jul. 30, 2019, pp. 014059-1-014059-8.

(Continued)

*Primary Examiner* — Linglan Edwards
*Assistant Examiner* — Joshua Raymond White
(74) *Attorney, Agent, or Firm* — JCIP GLOBAL INC.

(57) ABSTRACT

An active feedback control method for a quantum communication system based on machine learning is disclosed. In the transmission process of a quantum key distribution system, the present invention uses a pre-trained double-layer LSTM network to predict, according to a real-time ambient temperature, humidity and laser light intensity fluctuation, as well as voltage changes in the past moment, a zero-phase voltage value of a phase modulator at a receiving end at the next moment, and updates the network at a fixed time interval, so that the LSTM network can accurately predict for a long time, ensuring that the quantum key distribution system operates stably and efficiently for a long time. The present invention greatly improves the transmission efficiency of the quantum key distribution system by method of active prediction and feedback control. The present invention is not limited to being applied to quantum key distribution systems or phase encoding systems, and also applicable to quantum key distribution systems or quantum communication networks based on other encoding methods.

5 Claims, 3 Drawing Sheets

(56) References Cited

FOREIGN PATENT DOCUMENTS

| CN | 107612688 | 1/2018 | | |
|---|---|---|---|---|
| CN | 110365473 | 10/2019 | | |
| CN | 108365953 B | * 6/2020 | ............ | H04B 10/70 |
| WO | 2006124209 | 11/2006 | | |

OTHER PUBLICATIONS

Weiqi Liu, et al., "Integrating machine learning to achieve and automatic parameter prediction for practical continuous-variable quantum key distribution." Physical Review A, vol. 98, No. 2, Feb. 12, 2019, pp. 022316-1-022316-9.

"International Search Report (Form PCT/ISA/210)" of PCT/CN2020/070401, dated Apr. 2, 2020, pp. 1-4.

"Written Opinion of the International Searching Authority (Form PCT/ISA/237)" of PCT/CN2020/070401, dated Apr. 2, 2020, pp. 1-4.

* cited by examiner

ACTIVE FEEDBACK CONTROL METHOD FOR QUANTUM COMMUNICATION SYSTEM BASED ON MACHINE LEARNING

CROSS-REFERENCE TO RELATED APPLICATION

This application is a 371 of international application of PCT application serial no. PCT/CN2020/070401, filed on Jan. 6, 2020, which claims the priority benefits of China Patent Application No. 201910469672.X, filed on May 31, 2019. The entirety of each of the above mentioned patent applications is hereby incorporated by reference herein and made a part of this specification.

TECHNICAL FIELD

The present invention relates to the field of quantum information technology, and more particularly, to an active feedback control method for a quantum communication system based on machine learning.

BACKGROUND

Quantum cryptography is the core of quantum communication, and its security directly determines the security of quantum communication systems. The security of quantum cryptography is based on the basic principles of quantum mechanics. Further, by combining with Shannon's "one-time password" (OTP) theorem, in principle, it can provide legitimate users (Alice, Bob) with unconditional secure quantum communication. Since the first quantum cryptography protocol-BB84 protocol was proposed, quantum cryptography has made tremendous progress both in theory and in experiments. The existing practical quantum cryptographic systems can use different encoding methods, such as phase, polarization, and time-energy encoding; and among them, systems based on phase encoding are most widely used. However, due to the problem of phase drift in such systems, it is necessary to constantly calibrate the phase of a transmitting end and a receiving end in real time. At present, the most widely used one is the interference fringe scanning-transmission method, which enables the compensation of the system phase at regular intervals. However, during the operation of an interference fringe scanning program, a quantum cryptography system cannot transmit signals, resulting in lower overall system efficiency. In order to improve the transmission efficiency of the quantum cryptography system, FPGA-based real-time phase compensation technology can be used, but this method requires relatively high hardware overhead and also increases the complexity of the entire quantum cryptography system.

SUMMARY

The objective of the present invention is to address the above-mentioned shortcomings of the prior art, and propose an active feedback control method for a quantum communication system based on machine learning, which method can be applied to a quantum key distribution (QKD) system. In a stable phase modulation stage of the QKD system, a pre-trained double-layer LSTM network is used to predict, according to a real-time ambient temperature, humidity and laser light intensity, as well as voltage changes in the past moment, a zero-phase voltage value of a phase modulator at Bob's end at the next moment, and the network is updated at a fixed time interval, so that the LSTM network can accurately predict for a long time, maintaining the quantum key distribution system always in a stable and efficient operation state. The solution of the present invention greatly improves the transmission efficiency of the quantum key distribution system without increasing the complexity of the system hardware.

An active feedback control method for a quantum communication system based on machine learning, where the method applies a machine learning model of a Long-Short-Term-Memory (LSTM) neural network to a quantum communication system, and uses a phase-encoded quantum key distribution (QKD) system as one of the application scenarios, which is not limited to the QKD system or phase encoding system; the QKD system includes at least two user ends, Alice's end and Bob's end;

the method includes a training phase, a prediction phase, and an update phase in sequence;

training phase:

training data is divided into multiple sequences according to time order, the length of the sequence represents the time span of the piece of data, and the data at each time point in the sequence consists of corresponding features and a label; where the features may consist of an ambient temperature, a humidity, a laser intensity, a voltage at the current time point, and voltages at the previous four time points; the label may consist of a voltage at the next time point; in training the network, the Adam optimization algorithm is used, the entire training process requires at least 270 rounds, and all data needs to be standardized to Z-scores before being input into the network;

prediction phase:

the trained LSTM network can be connected to a phase voltage regulation system of a phase modulator at Bob's end; the LSTM network at this phase needs to read, in real time, the current temperature and humidity from a temperature and humidity detector, the current laser light intensity from an optical power meter, and displacement voltages at five time points from a shift register, the voltages at these five time points being a voltage value at the current time point and voltage values at the previous four time points; the network predicts a zero-phase voltage at the next time point according to the input data, and inputs the voltage value into the phase modulator at Bob's end, thus achieving the phase stability control of the system; and update phase:

in order to provide the LSTM with the ability to accurately predict for a long time, a combination of prediction and update is adopted; after the network predicts for a period of time, an accurate zero-phase voltage is obtained by running an interference fringe scanning program briefly and fed back to the LSTM network; the LSTM uses, according to an accurate label value, the error back propagation method to update its weight and bias values, and the updated LSTM network is reconverted to the prediction mode.

Further, in the training phase, the typical features of the data at each time point in the sequence consist of a temperature, a humidity, a laser light intensity, and a displacement voltage, where the displacement voltage may consist of one current voltage and voltages at the previous four time points; and the typical features are not limited to those given above, and other values can be selected according to actual needs.

Further, the feedback control of the active feedback control method can be accomplished by an interference fringe scanning program, whose feedback process is aimed at updating the LSTM network; a real-time voltage scanned by the interference fringe scanning program is fed back to the LSTM network, so that the network updates its weight and bias voltage values; the feedback control of the active feedback control method is not limited to be accomplished by the interference fringe scanning program mentioned above, and can also be accomplished by other scanning programs including polarization scanning.

Further, the training phase and the prediction phase of the active feedback control method can be separated from each other, where this method uses continuously updating the network before each prediction so that the LSTM network only needs to be fine-tuned according to the actual situation in the prediction phase, thereby achieving separation of the training phase from the prediction phase.

Further, the active feedback control method uses a double-layer LSTM network for the stable phase modulation process of the QKD system, but it is not limited to using the double-layer LSTM network, and the network structure can be adjusted according to the complexity of the actual quantum communication system.

The beneficial effects of the present invention are that compared with a conventional interference fringe scanning program and a FPGA-based real-time phase compensation solution, the solution of the present invention adopts a prediction and feedback control method using a Long-Short-Term-Memory neural network based on software control, without the addition of additional hardware devices, which not only eliminates the system complexity caused by the use of additional devices, but also avoids the risk of possible side channel vulnerabilities. In addition, this method can greatly improve the transmission efficiency of the entire QKD system, and realize real-time phase compensation control based on software control. Moreover, the updating process at intervals can also make the system operate stably for a long time. The present invention can ensure stable and efficient operation of the QKD system for a long time while maintaining an equivalent level of bit error rate compared with the traditional method.

DESCRIPTION OF THE EMBODIMENTS

The technical solutions of the present invention are further elaborated below with reference to the drawings of the description.

A phase voltage control system in the solution of the present invention predicts a zero-point phase voltage mainly by the use of an LSTM network. The following is the working principle of the LSTM network.

Figure 1:
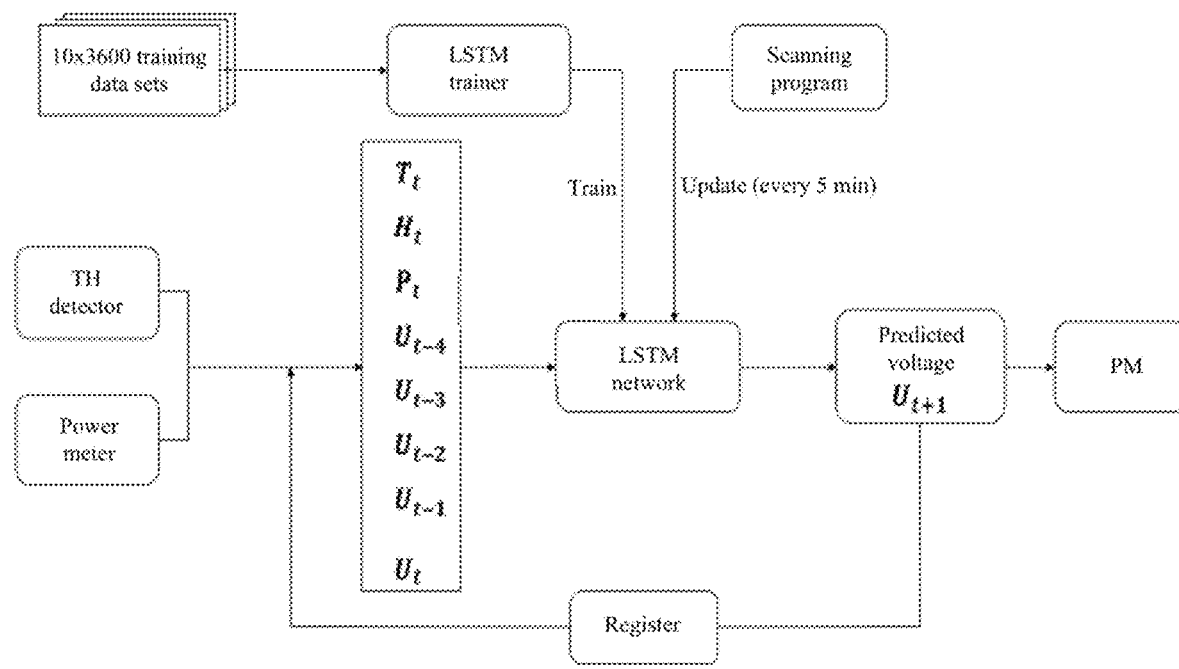
FIG. 1 is a flowchart of the solution of the present invention.
Figure 2:
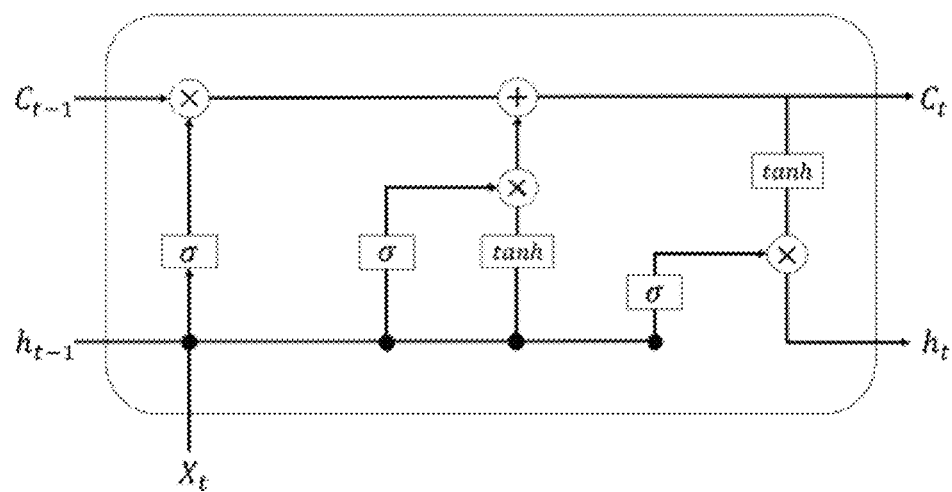
FIG. 2 shows an internal structure of an LSTM network in an embodiment of the present invention.
Figure 3:
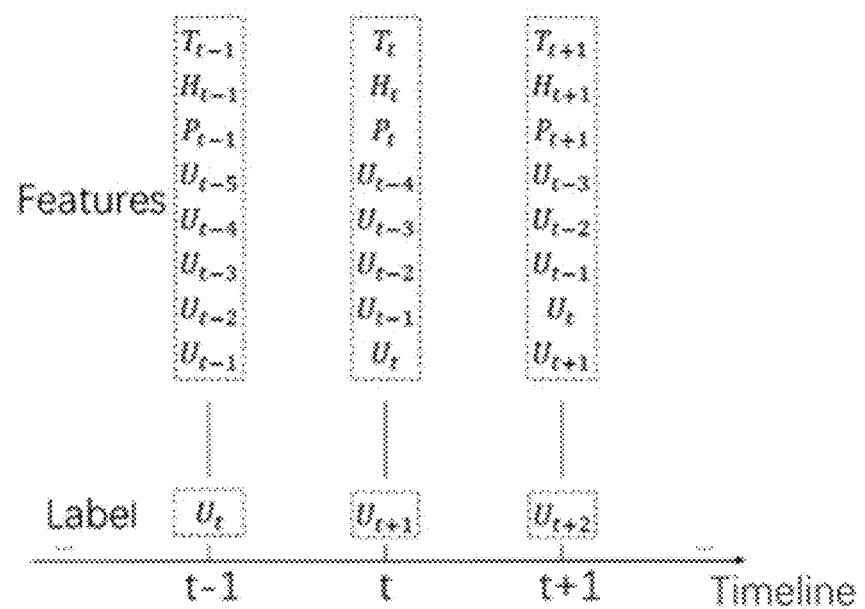
FIG. 3 shows a structure of data at each time point in a sequence in the present invention.

The LSTM network consists of a series of repeated neural network modules. As shown in FIG. 1, its core is a cell conveyor belt Ct. The knowledge learned by training of the LSTM network is delivered along this conveyor belt and runs through the entire chain. The LSTM network deletes or adds information to the cell state through the gate structure. One LSTM block has three gate structures to control the state of a cell unit, which are called forget gate, input gate and output gate, respectively.

First, the forget gate determines which information delivered from the previous LSTM block needs to be discarded. The feature xt of the current state and the output ht of the previous LSTM block will be processed by the corresponding weight Wf and bias bf, and then processed by a sigmoid activation function $\sigma$. The output results ft are as follows:

$$f_t = \sigma(W_f \cdot [h_{t-1}, x_t] + b_f).$$

In the next step, the network realizes the input of specific information through two processes. First, an input gate consisting of a sigmoid layer functions to update the information in the cell, with the formula shown below:

$$i_t = \sigma(W_i \cdot [h_{t-1}, x_t] + b_i),$$

and then, a tan h layer adds information that helps the network to realize a memory function into the cell structure in the form of a vector, with the formula shown below:

$$C_t = \tan h(W_c \cdot [h_{t-1}, x_t] + b_c).$$

The cell structure realizes the update of memory information in the cell through the multiplication operation with the above two gate structures, with the formula shown below:

$$C_t = f_t \times C_{t-1} + i_t \times C_t.$$

Finally, the cell state is processed by the tan h layer and subjected to multiplication operation with the output gate to achieve the output of specific information, with the formula shown below:

$$O_t = \sigma(W_o \cdot [h_{t-1}, x_t] + b_o),$$

$$h_t O_t \times \tan h(C_t).$$

Through the above calculations, the LSTM network can realize the long-term memory effect of information.

The implementation process of the phase prediction and feedback control solution of quantum key distribution based on an Long-Short-Term-Memory neural network will be described in detail below.

Training phase:

Taking into account the time memory characteristics of the LSTM network, in the training phase, training data needs to be divided into multiple sequences according to time order, the length of the sequence represents the time span of this piece of data, and the data at each time point in the sequence consists of corresponding features and a label. The features consist of an ambient temperature, a humidity, a laser intensity, a voltage at the current time point, and voltages at the previous four time points. The label consists of a voltage at the next time point.

In the training phase, first, the training data is collected, where this process first uses a traditional interference fringe scanning program to obtain data of a zero-phase voltage applied by a phase modulator on Bob's end that varies over time, and then splices data of the temperature, humidity, and laser intensity that varies over time with data of the zero-phase voltage. Each row of the data is a specific feature value at a certain moment, and each column is a feature that changes over time. Each piece of training data consists of 3,600 data points, and there is ten pieces of training data in total. The duty cycle of the experimental system used in the present solution is 0.5, that is, another 10 seconds are needed for phase compensation after each 10 seconds of transmission. Therefore, the time span corresponding to each piece of training data is 20 hours.

In training the network, the solution of the present invention uses the Adam optimization algorithm, an indicator of the training process is the mean square error, the entire training process requires at least 270 rounds, and all data needs to be standardized to Z-scores before being input into the network.

Prediction phase:

The trained LSTM network should be connected to a phase voltage regulation system of the phase modulator at Bob's end, and the LSTM network at this phase needs to read, in real time, the current temperature and humidity from a temperature and humidity detector, the current laser light intensity from an optical power meter, and displacement voltages at five time points from a shift register, the voltages at these five time points being a voltage value at the current time point and voltage values at the previous four time points. The network predicts a zero-phase voltage at the next time point according to the input data, and inputs this voltage value into the phase modulator at Bob's end, thereby realizing the phase stability control of the system.

The present solution adopts the way of changing to an update mode after continuously predicting 25 voltage values, where the time span of each continuous prediction is 5 minutes.

Update phase:

In order to provide the LSTM with the ability to accurately predict for a long time, the present solution adopts a working mode that combines prediction and update. After the network predicts for a period of time, an accurate zero-phase voltage is obtained by running an interference fringe scanning program briefly and fed back to the LSTM network; the LSTM uses, according to an accurate label value, the error back propagation method to update its weight and bias values, and the updated LSTM network is reconverted to the prediction mode. The time for each update phase is 50 seconds.

In order to make the objectives, technical solutions, and advantages of the present invention clearer, the present invention is further described in detail below in connection with specific embodiments and with reference to accompanying drawings.

Figure 4:
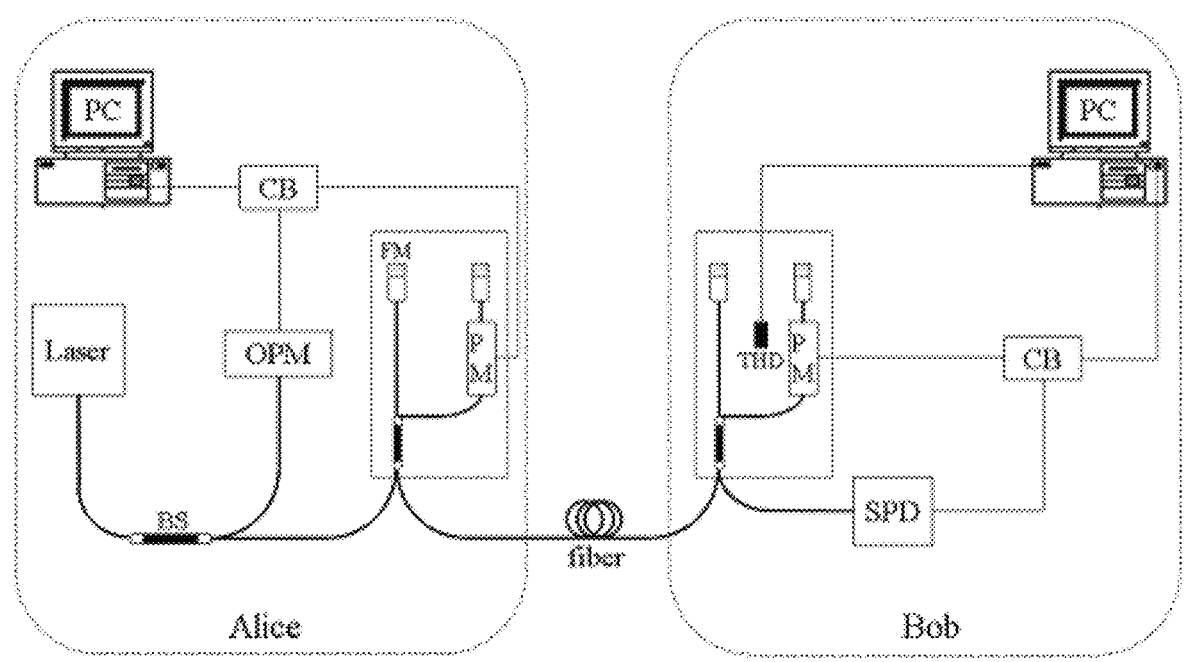
FIG. 4 shows an experimental device of a QKD system used in an embodiment of the present invention.

FIG. 4 is a experimental device of the solution of the present invention. At Alice's end, an laser (repetition rate 1 MHz, center wavelength 1550 nm) outputs laser to a 1:99 beam splitter (BS), and the beam splitter divides the beam into two paths, where 1% of the light is sent to an optical power meter and 99% of the light is sent to the Faraday Michelson interference fringe (FMI) on Alice's end. Each light pulse sent to the FMI is randomly encoded into a state in the BB84 protocol and then transmitted to the receiving end Bob through a commercial single-mode fiber.

Bob's end randomly selects X basis or Z basis to measure the quantum state, and the measurement is accomplished through the FMI on Bob's end. A control box (CB) and a computer are placed on both Alice's end and Bob's end. These two devices are used to run the LSTM network and deliver voltage to the phase modulator. The solution of the present invention is also equipped with an optical power meter (OPM), a temperature and humidity detector (THD), and a single photon detector (SPD) for real-time recording of a laser light intensity, a temperature, a humidity, and a photon count rate, respectively. The single photon detector used in the experimental system of the solution of the present invention is an InGaAs detector working in a gate mode.

The experiment of the solution of the present invention has passed 50 kilometers and 150 kilometers of optical fiber detection, and the results are compared with that of a traditional interference fringe scanning program. The transmission process uses three kinds of intensity (signal state intensity 0.5, decoy state intensity 0.1, and vacuum state intensity 0), respectively, to modulate the light pulse. Also, the experimental system of the solution of the present invention has the background error of 1.23%, the detector efficiency of 10%, and the dark count rate of 0.8 MHz.

Figure 5:
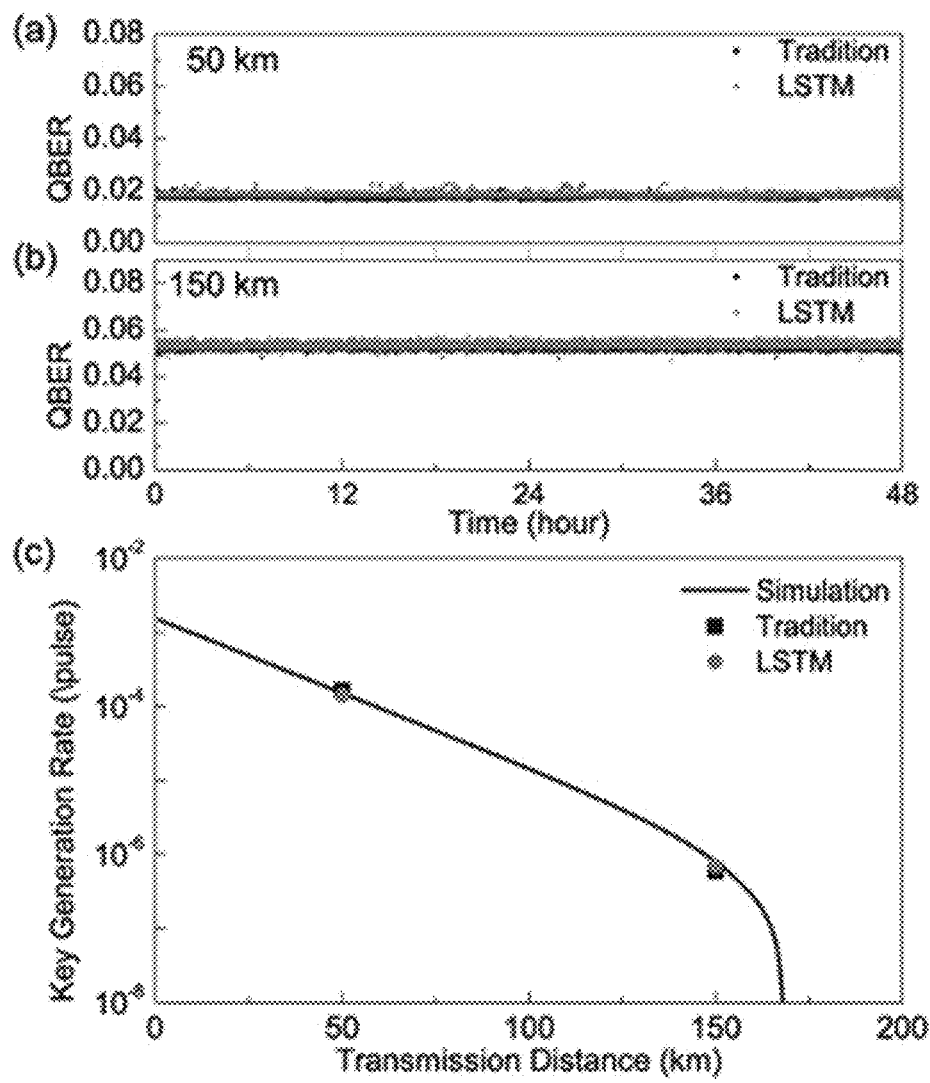
FIG. 5 shows comparison of bit error rate of the present invention vs. a "scanning-transmission" solution.

FIG. 5 shows comparison of bit error rate between the solution of the present invention and the traditional solution. (a) of FIG. 5 and (b) of FIG. 5 show the changes of qubit error rate (QBER) of the system signal state at 50 km and 150 km over 48 hours, respectively. It can be seen from the two figures that the QBER result of the solution of the present invention is basically at the same level as that of the traditional interference curve scanning solution, which proves the stability and reliability of the solution of the present invention. (c) of FIG. 5 shows comparison between the result of the generation rate experiment and the theoretical simulation result. The solid line in the figure is the theoretical simulation result, the square dots are the experimental results of the traditional solution, and the circular dots are the experimental results of the solution of the present invention.

Figure 6:
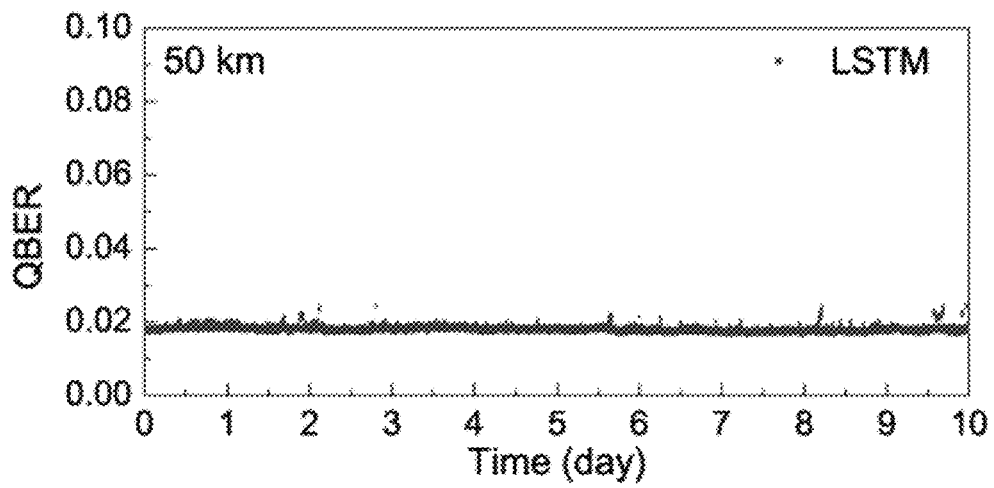
FIG. 6 shows test results for a long-time operation of the present invention.

FIG. 6 shows test results of a long-term operation of the solution of the present invention. In the figure, within ten days of continuous operation of the system, the QBER do not exhibit a significant increase, which proves that the solution of the present invention can still maintain the accuracy of prediction and the QBER stability of the system for a long-time operation.

In summary, the present invention has experimentally verified that a phase prediction and feedback control solution for a quantum key distribution system based on an Long-Short-Term-Memory neural network, by use of voltage prediction plus network updating, can increase the transmission efficiency of the QKD system to 83% and more, and can also ensure that the QBER of the system remains at the same level as that of the traditional solution. In addition, the solution of the present invention can be extended to any QKD protocol and system.

The above are only preferred embodiments of the present invention, and the scope of protection of the present invention is not limited to the above embodiments. Any equivalent modifications or changes made by those of ordinary skill in the art based on the disclosure of the present invention should be included within the scope of protection described in the claims.

What is claimed is:

1. An active feedback control method for a quantum communication system based on machine learning, wherein:
the method applies a machine learning model of a Long-Short-Term-Memory (LSTM) neural network to a quantum communication system, and uses a phase-encoded quantum key distribution (QKD) system;
the QKD system comprises at least two user ends, a first end and a second end;
the method comprises a training phase, a prediction phase, and an update phase in sequence;
wherein the training phase comprises:
dividing a training data into multiple sequences according to time order, wherein a length of the sequence of the multiple sequences represents a time span of a piece of training data, and the piece of training data at each time point in the sequence consists of corresponding features and labels;

wherein the features consist of an ambient temperature, a humidity, a laser intensity, a voltage at a current time point, and voltages at a previous four time points;

wherein the labels consist of a voltage at a next time point;

training the LSTM neural network using an Adam optimization algorithm;

wherein an entire training process requires at least 270 rounds, and the training data is standardized to Z-scores before being input into the LSTM neural network;

wherein the prediction phase comprises:

connecting the trained LSTM neural network to a phase voltage regulation system of a phase modulator at the second end;

the LSTM neural network at the prediction phase reading, in real time, a current temperature and humidity from a temperature and humidity detector, a current laser light intensity from an optical power meter, and displacement voltages at five time points from a shift register, wherein the displacement voltages at these five time points are a voltage value at the current time point and voltage values at the previous four time points;

the LSTM neural network predicting a predicted zero-phase voltage at the next time point according to an input data, and inputs the voltage value into the phase modulator at the second end, thus achieving a phase stability control of the system; and wherein the update phase comprises:

increasing a prediction accuracy duration of the LSTM neural network by adopting a work mode comprising a combination of predictions and updates;

after the LSTM neural network predicts for a period of time, obtaining a determined zero-phase voltage by running an interference fringe scanning program and feeding the determined zero-phase voltage back to the LSTM neural network;

the LSTM neural network using, according to a determined label value, an error back propagation method, wherein the error back propagation method updates a weight and bias values of the LSTM neural network, and reconverting an updated LSTM network to the prediction phase.

2. The active feedback control method for the quantum communication system based on machine learning according to claim 1, wherein: the training phase further comprises:
wherein features of the training data at each time point in the sequence consist of the temperature, the humidity, the laser light intensity, and a displacement voltage,
wherein the displacement voltage consists of one current voltage and the voltages at the previous four time points; and features of the training data further consists of other values selected.

3. The active feedback control method for the quantum communication system based on machine learning according to claim 1, wherein:
a feedback control of the active feedback control method is executed by the interference fringe scanning program, and a feedback process of the interference fringe scanning updates the LSTM neural network;
a real-time voltage is scanned by the interference fringe scanning program and the real-time voltage is fed back to the LSTM neural network, wherein the LSTM neural network updates the weight and bias voltage values of the LSTM neural network.

4. The active feedback control method for the quantum communication system based on machine learning according to claim 1, wherein:
the training phase and the prediction phase of the active feedback control method are separate from each other,
wherein the active feedback control method continuously updates the LSTM neural network before each prediction, wherein the LSTM neural network is only fine-tuned according to an actual situation in the prediction phase.

5. The active feedback control method for the quantum communication system based on machine learning according to claim 1, wherein:
the active feedback control method uses a double-layer LSTM network for a stable phase modulation process of the QKD system, and a network structure is adjusted according to a complexity of the quantum communication system.

* * * * *